United States Patent [19]

Kobayashi et al.

[11] Patent Number: 5,170,281
[45] Date of Patent: Dec. 8, 1992

[54] SPATIAL LIGHT MODULATION DEVICE CAPABLE OF ARBITRARILY SELECTING AN INPUT/OUTPUT CHARACTERISTIC

[75] Inventors: Yuji Kobayashi; Tsutomu Hara; Haruyoshi Toyoda, all of Shizuoka, Japan

[73] Assignee: Hamamatsu Photonics K.K., Shizuoka, Japan

[21] Appl. No.: 682,260

[22] Filed: Apr. 8, 1991

[30] Foreign Application Priority Data

Apr. 9, 1990 [JP] Japan .................................. 2-93668
Jun. 18, 1990 [JP] Japan ................................. 2-159424
Jun. 18, 1990 [JP] Japan ................................. 2-159425

[51] Int. Cl.$^5$ ............................ G02F 1/03; G02F 1/01
[52] U.S. Cl. .................................... 359/245; 359/255; 359/262; 359/263; 359/277
[58] Field of Search ............... 359/245, 249, 250, 251, 359/256, 257, 262, 263, 277, 252, 255, 254, 301, 315, 320, 557, 586

[56] References Cited

U.S. PATENT DOCUMENTS

| 4,481,531 | 11/1984 | Warde et al. | 359/255 |
| 4,741,602 | 5/1988 | Hara et al. | 359/262 |
| 4,763,996 | 8/1988 | Hara et al. | 359/249 |
| 4,830,472 | 5/1989 | Mukouzaka | 359/256 |
| 4,923,287 | 5/1990 | Ooi et al. | 359/245 |

FOREIGN PATENT DOCUMENTS 0249018 11/1986 Japan .................. 359/249
2-30494 7/1990 Japan .

OTHER PUBLICATIONS

J. A. McEwan, et al. "Four Special Functions of a Microchannel Spatial Light Modulator" Postdeadline Papers, Conference on Laser and Electro-Optics, Paper 1 ('85).
"Variable Nonlinear Transfer Characteristics of MSLM", Japanese Journal of Applied Physics, vol. 29, No. 8, Aug., 1990, pp. 1529–1532.
T. Hara et al., "A Spatial Light Modulator" Advances in Electronics and Electron Physics, vol. 64B, pp. 637–647. Copyright 1985.

Primary Examiner—Eugene R. LaRoche
Assistant Examiner—Evelyn A. Lester
Attorney, Agent, or Firm—Finnegan, Henderson, Farabow, Garrett and Dunner

[57] ABSTRACT

A spatial light modulator includes an electro-optic crystal plate and a mesh electrode for capturing secondary electrons emitted from the crystal plate. Primary electrons carrying an image corresponding to an input optical image are incident on the front surface of the crystal plate to write a charge pattern thereon. In a writing operation, a dc voltage and a ramp voltage is applied to the mesh electrode and the back surface of the crystal plate, respectively. The dc voltage and a variation range of the ramp voltage are shifted to obtain a desired input/output characteristic of the device. Alternatively, a decreasing rate of the ramp voltage is changed to obtain a desired characteristic.

11 Claims, 7 Drawing Sheets

FIG. 3(a)   FIG. 3(b)   FIG. 3(c)
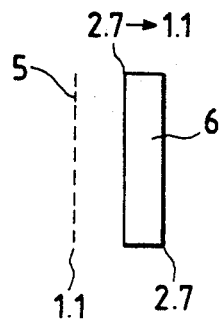
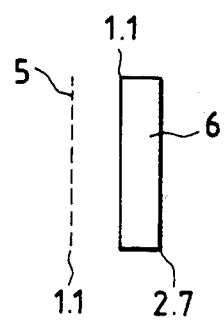
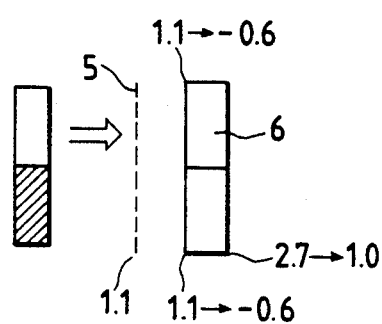
FIG. 4(a)   FIG. 4(b)   FIG. 4(c)
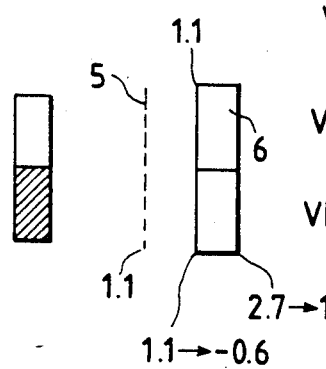
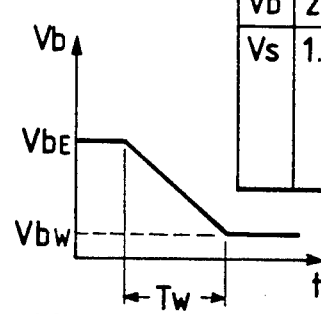

$$P = \frac{1}{1+\exp(-u_i/T)}$$

SPATIAL LIGHT MODULATION DEVICE CAPABLE OF ARBITRARILY SELECTING AN INPUT/OUTPUT CHARACTERISTIC

BACKGROUND OF THE INVENTION

The present invention relates to a spatial light modulation device which converts an incoherent optical image into a coherent optical image, and is applicable to, e.g., parallel, coherent optical information processing.

Conventional light modulation devices utilize a phenomenon that a phase difference between the ordinary ray and extraordinary ray passing through an electro-optic crystal, which is caused by its birefringence, is changed by a voltage across the crystal, and their input/output characteristic (i.e., $\gamma$-characteristic) is changed by choosing between the normal mode and the hard clip mode. In writing an optical image in the normal mode, the voltage of the back surface of the electro-optic crystal is set such that the voltage of its front surface does not become negative, and the back surface voltage is abruptly decreased like a step function. In the hard clip mode, on the other hand, the back surface voltage is set such that the front surface voltage can take a negative value, and the back surface voltage is ramped down.

Therefore, conventional devices can only choose, as the input/output characteristic, one of the linear (i.e., $\sin^2$) characteristic of the normal mode and the thresholding characteristic of the hard clip mode. This causes a problem that the image processing cannot be performed while arbitrarily selecting the grey scale.

Conventional devices encounter another problem when they are used as units in a neural network. That is, because of their narrow range in selecting the input/output characteristic, it is difficult to adjust the time to be taken until a network is stabilized.

SUMMARY OF THE INVENTION

An object of the present invention is to provide a spatial light modulation device capable of selecting an arbitrary input/output characteristic, which means that image processing can be performed while arbitrarily selecting the grey scale, and that in its application to a neural network the network can be settled in a shorter period.

Another object of the invention is to provide a spatial light modulation device which can select an arbitrary input/output characteristic without incurring an unstable operation.

According to a first aspect of the invention, a spatial light modulation device comprises:

an electro-optic plate having a front surface and a back surface;

means for producing an electron image to be input to the front surface of the electro-optic plate to form a charge pattern thereon;

an electrode, disposed in front of the front surface of the electro-optic plate, for capturing secondary electrons emitted from the front surface; and voltage supply means for supplying first and second voltages to the electrode and the back surface of the electro-optic plate, respectively, the first voltage being a dc voltage, the second voltage being decreased, in a writing operation of the device, like a ramp function in a ramped variation range, the first and second voltages being set so as to provide a lock-out state, and the first voltage and the ramped variation range of the second voltage being shifted to obtain a desired input/output characteristic of the device.

According to a second aspect of the invention, a spatial light modulation device comprises:

an electro-optic plate having a front surface and a back surface;

means for producing an electron image to be input to the front surface of the electro-optic plate to form a charge pattern thereon;

an electrode, disposed in front of the front surface of the electro-optic plate, for capturing secondary electrons emitted from the front surface; and voltage supply means for supplying first and second voltages to the electrode and the back surface of the electro-optic plate, respectively, the first voltage being a dc voltage, the second voltage being decreased, in a writing operation of the device, like a ramp function with a ramped decreasing rate, the first and second voltages being set so as to provide a lock-out state, and the ramped decreasing rate of the second voltage being changed to obtain a desired input/output characteristic of the device.

BRIEF DESCRIPTION OF THE DRAWINGS

FIGS. 3(a)–3(c) are schematic diagrams for a description of an erasing and a writing operation;

FIGS. 4(a)–4(c) are diagrams for a description of the relationship among ramped decrease of a back surface voltage of an electro-optic crystal plate, a front surface voltage thereof, and a writing operation;

DESCRIPTION OF THE PREFERRED EMBODIMENTS

Embodiments of the present invention will be described with reference to the accompanying drawings.

Figure 1:
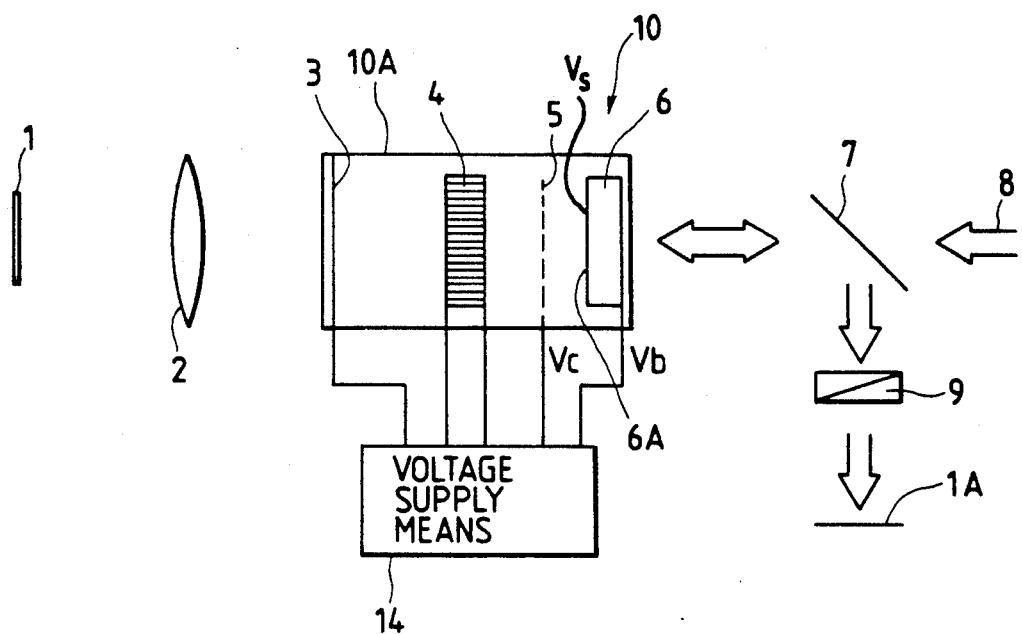
FIG. 1 is a schematic sectional view for a description of the fundamental construction and operation of a spatial light modulation device according to the present invention.

FIG. 1 is a diagram for a description of the configuration and operation of a spatial light modulation device 10 according to the invention. In this figure, reference numeral 1 denotes an input image; 2, a lens; 3, a photocathode; 4, a microchannel plate; 5, a mesh electrode for capturing secondary electrons; 6, a LiNbO$_3$ electro-optic crystal plate; 6A, a charge storage surface of the crystal plate 6; 7, a half mirror; 8, read light (coherent light) having non-random polarization (linear, circular or elliptical); 9, an analyzer; 1A, an output image; and 10A, a spatial light modulator. The input image 1 is imaged by the lens 2 onto the photocathode 3 of the spatial light modulator 10A, where it is converted into an photoelectron image. Electrons constituting the photoelectron image are multiplied by the microchannel plate 4, and are then incident on the charge storage surface 6A of the electro-optic crystal plate 6 to form a charge pattern thereon. The charge pattern determines the distribution of an electric field across the crystal plate 6, which in turn determines the distribution of refractive index of the crystal plate 6 according to the Pockels effect.

A voltage supply means 14 provides a voltage $V_c$ to the mesh electrode 5, and a voltage $V_b$ to the back surface of the crystal plate 6.

Polarized read light 8 is uniformly input to the electro-optic crystal plate 6. Since the light reflected from the charge storage surface 6A experiences a change in polarization which is caused by birefringence of the crystal plate 6, the output image 1A having an intensity distribution corresponding with that of the input image 1 is obtained by passing the reflected light through the analyzer 9.

First, main functions of the spatial light modulation device 10, which are related to the invention, will be described.

Figure 2:
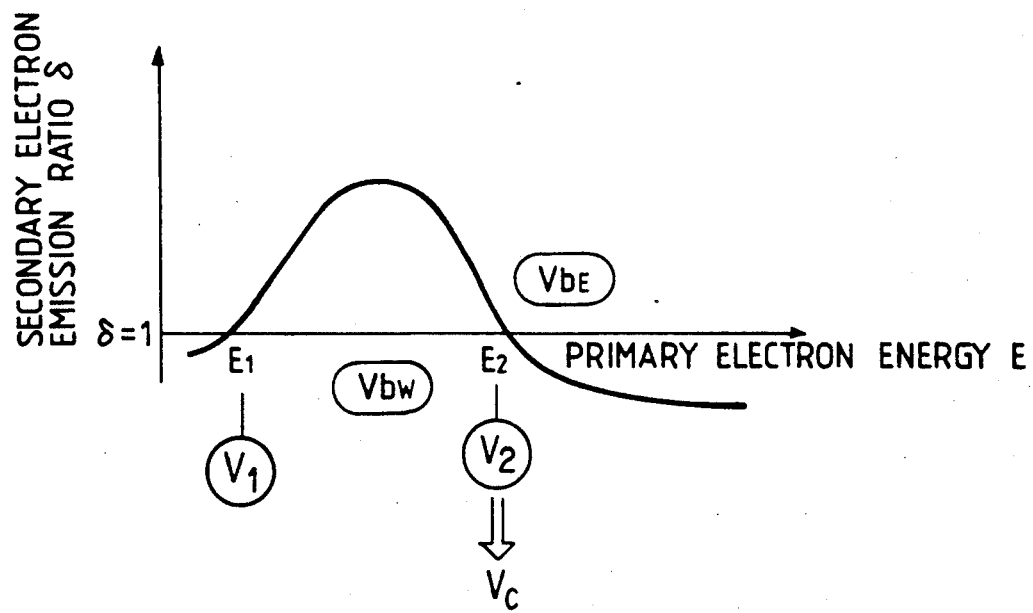
FIG. 2 is a graph showing a relationship between the secondary electron emission ratio and the energy of primary electrons incident on an electro-optic crystal plate used in a spatial light modulator.

By virtue of the very high resistivity of the crystal plate 6, the spatial light modulator 10A has a function of storing a charge distribution on the front surface 6A of the crystal plate 6 for a long period of time (more than several days). Further, the modulator 10A can selectively form either a positive or negative charge pattern on the front surface 6A of the crystal plate 6. FIG. 2 shows a secondary electron emission characteristic of the electro-optic crystal plate 6. A conductive electrode is formed on the back surface of the crystal plate 6, and is supplied with the voltage $V_b$.

The crystal surface 6A is charged negative if the energy E of primary electrons incident on the surface 6A is smaller than the first crossover energy $E_1$ or larger than the second crossover energy $E_2$, because the number of secondary electrons emitted from the surface 6A is smaller than that of incident primary electrons (i.e., $\delta < 1$). On the contrary, the surface 6A is charged positive if the energy E is located between the two crossover energies $E_1$ and $E_2$, because the number of secondary electrons is greater than the number of primary electrons ($\delta > 1$).

Whether a charge pattern is written in the form of positive charges or negative charges on the front surface 6A of the electro-optic crystal plate 6 is determined by controlling the voltage $V_c$ of the mesh electrode 5 and the back surface voltage $V_b$ of the crystal plate 6. It is noted that a subtraction function can be realized by either of the two following procedures. A negative charge pattern is first developed, and then another pattern is written in the form of positive charges, or a positive charge pattern is first developed, and then another pattern is written in the form of negative charges. The amount of subtraction can be controlled by the following methods: changing the intensity of incident light at the time of the subtraction, changing the duration of a voltage applied to the microchannel plate 4, or changing a voltage applied to the microchannel plate 4.

The erasing and writing operations, which are already known in the art, will be described hereunder for a positive charge pattern with reference to FIG. 2. The voltage $V_1$ corresponding to the first crossover energy $E_1$ is determined by properties of the front surface 6A. The voltage $V_2$ corresponding to the second crossover energy $E_2$ in FIG. 2 is determined by the voltage $V_c$, and is approximately equal thereto.

In the erasing operation, the back surface voltage $V_b$ ($V_{be}$) is set at a value slightly higher than the second crossover voltage $V_2$, and, as a result, the voltage $V_s$, takes a value equal to the second crossover voltage $V_2$ plus a voltage increase due to positive charges written on the front surface 6A. With this front surface voltage $V_s$, the primary electron energy is larger than the energy $E_2$, which means $\delta < 1$. Therefore, negative charges are accumulated until the voltage $V_s$ reaches the second crossover voltage $V_2$. In this erased state, the front surface 6A is in an equilibrium, where $\delta = 1$, and there is no charge remaining.

In the writing operation, the back surface voltage $V_b$ is set at a voltage $V_{bw}$ between the first and second crossover voltages $V_1$ and $V_2$, which voltage $V_{bw}$ assures a sufficient dynamic range. With the voltage $V_{bw}$, the primary electron energy also takes a value between $E_1$ and $E_2$ since the front surface voltage $V_s$ becomes approximately equal to $V_{bw}$. As a result, the secondary electron emission ratio $\delta$ becomes larger than unity, and a positive charge pattern is formed, i.e., written on the front surface 6A. Secondary electrons emitted from the front surface 6A are captured by the mesh electrode 5 having the voltage $V_c$ which is higher than $V_s$.

Next, the real-time thresholding (hard clip) operation will be described. The spatial light modulator 10A can perform the real-time thresholding operation by properly setting the voltages $V_c$ and $V_b$.

The mesh electrode 5 is disposed in the vicinity of the front surface 6A of the crystal plate 6. If the voltage $V_c$ of the mesh electrode 5 is set at a proper value and if a sufficient number of electrons are supplied to the front surface 6A (i.e., the input light intensity is high enough), the front surface voltage V, becomes the same as the voltage $V_c$, which is approximately equal to the second crossover voltage $V_2$. This is explained as follows (see FIG. 2). If the front surface voltage $V_s$ is higher than the voltage $V_c$, fewer secondary electrons than primary electrons are emitted from the front surface 6A, reducing the potential of the front surface 6A. On the other hand, if the front surface voltage $V_5$ is lower than the voltage $V_c$, more secondary electrons than primary electrons are emitted from the front surface 6A, increasing the surface potential.

In setting the voltage $V_c$, it should be considered that the relationship between the voltages $V_c$ and $V_b$ is dependent on the birefringence which originates from the thickness of the electro-optic crystal plate 6. That is, the relationship between the difference $|V_{be}-V_{bw}|$ and the voltage $V_c$ is dependent on the crystal thickness. Therefore, the setting of, e.g., $V_c=1.1$ kV, $V_b=1.0$-2.7 kV may be obtained using a device such as a phase compensating tube. In this case, there occurs, in the writing operation ($V_{bw}=1.0$ kV), the "lock-out state", in which the front surface voltage $V_s$ becomes negative (in this case, $-0.6$ kV; see FIG. 3(c)) and electrons cannot reach the front surface 6A. FIGS. 3(a) and 3(b) show the erasing operation and the erased state, respectively.

However, a different phenomenon occurs if the back surface voltage $V_b$ is decreased slowly like a ramp function by the voltage supply means 14, as shown in FIG. 4(b). In this ramp mode, in the upper portion of the crystal plate 6 (see FIG. 4(a)), where a large number of electrons are supplied due to high intensity of the input light, sufficient secondary electron emission prevents the front surface voltage $V_s$ from becoming negative. On the other hand, in the lower portion of the crystal plate 6, where only a small number of electrons are supplied, the positive charge build-up cannot counteract the decrease of the front surface voltage $V_s$. In this latter case, the surface potential becomes negative, so that electrons cannot reach the front surface 6A.

As a result, the front surface 6A of the crystal plate 6 has two kinds of areas depending on the intensity of input light: a first area (i.e., lower portion) of negative potential where the writing operation cannot be performed; and a second area (i.e., upper portion) of positive potential where the writing operation can be performed. This means realization of the thresholding function with respect to the input light intensity. For example, the writing operation becomes possible only in areas where electrons enough for the increase of the front surface voltage $V_s$ to respond to the ramped decrease of the back surface voltage $V_b$ are supplied. The threshold intensity of the input light, i.e., the lowest intensity with which the writing operation is possible, is determined by the decreasing rate of the back surface voltage $V_b$.

Based on the above phenomenon, the present invention provides a "variable-$\gamma$ mode" by changing the voltage $V_c$ of the mesh electrode 5 in the hard clip mode. For example, the voltage supply means 14 shifts the voltage $V_c$ and the variation range of the ramped decrease of the voltage $V_b$ in the following manner:

$V_c=1.1$ kV, $V_b=1.0$-2.7 kV  (1)

$V_c=0.6$ kV, $V_b=0.5$-2.2 kV  (2)

$V_c=0.3$ kV, $V_b=0.2$-1.9 kV  (3)

$V_c=0.1$ kV, $V_b=0$-1.7 kV  (4)

Figure 5:
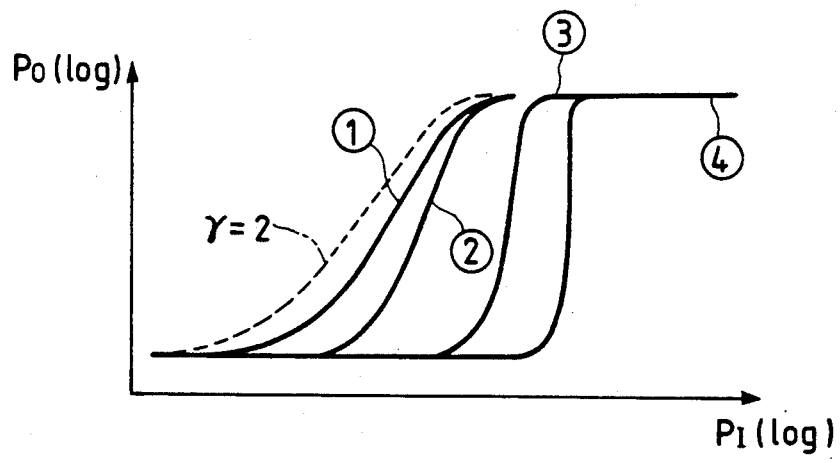
FIG. 5 is a graph showing input/output characteristics of a spatial light modulation device in a variable-$\gamma$ mode operation.

If the decreasing rate of the back surface voltage $V_b$ is kept constant, a plurality of characteristic curves having different $\gamma$'s can be obtained as shown in FIG. 5. A large $\gamma$ value represents a steep slope of a characteristic curve.

Figure 6:
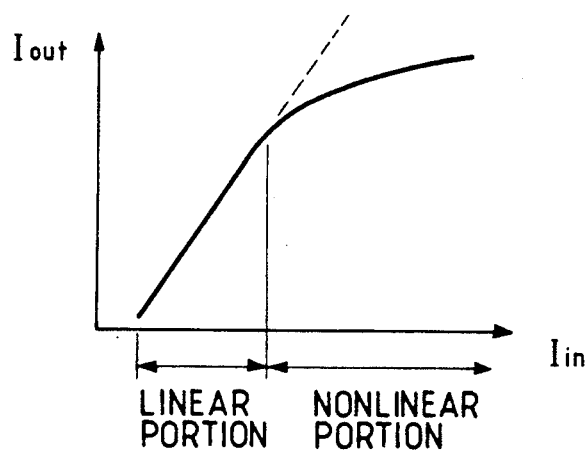
FIG. 6 is a graph showing a typical input/output characteristic of a microchannel plate.
Figure 7:
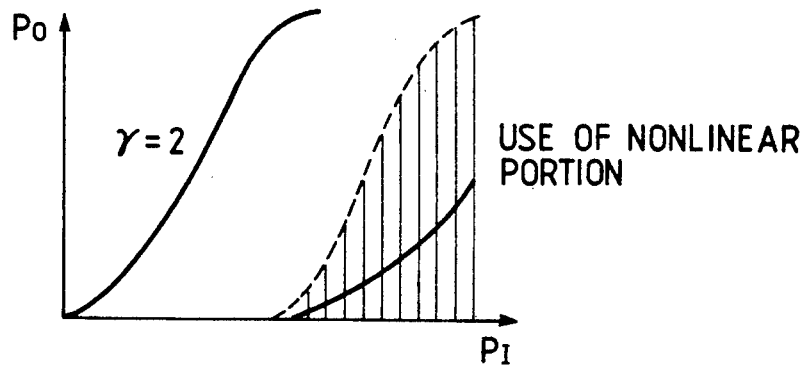
FIG. 7 is a graph showing an input/output characteristic of a spatial light modulation device in the case of utilizing a nonlinear portion of the input/output characteristic of the microchannel plate.

The curves in FIG. 5 are ones obtained by using the linear portion of the input/output characteristic of the microchannel plate 4 (see FIG. 6). If the non-linear portion is used, for the same increase of the input $I_{in}$ the output $I_{out}$ increases by a small amount compared to the case of using the linear portion, providing $\gamma$ values smaller than two as shown in FIG. 7. (Even with $\gamma$ smaller than two, the variable-$\gamma$ mode can be established in a manner similar to the above.)

Figure 8:
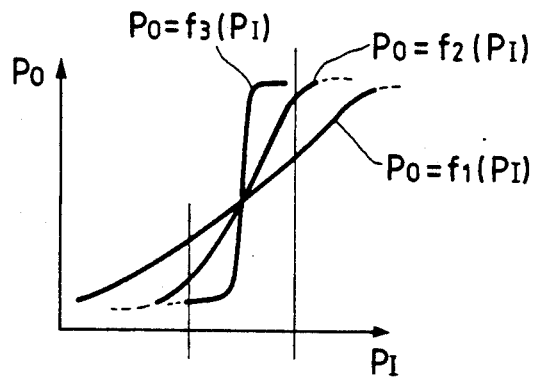
FIG. 8 is a graph showing input/output characteristics obtained by changing $\gamma$, which are applicable to linear and nonlinear operations.

Half-tone processing can be realized by utilizing the variable-$\gamma$ input/output characteristics of the spatial light modulation device 10. That is, the following becomes possible: image processing with arbitrary grey scale, function conversion in linear operations, and linear and nonlinear operations. In FIG. 8, $f_1$ and $f_2$ represent linear operations, and $f_3$ a nonlinear operation (step function).

Further, the variable-$\gamma$ input/output characteristics of the spatial light modulation device 10 enables itself to be employed as a unit in a neural network. This application will be described in the following.

Figure 9:
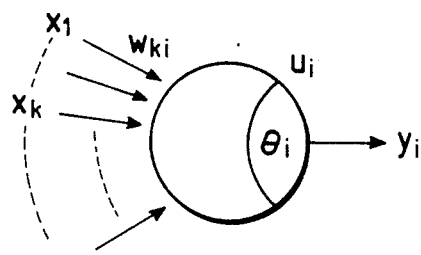
FIG. 9 is a chart for a description of a unit of a neural network.
Figure 10A:
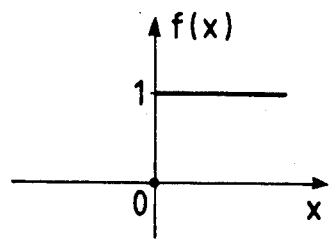
FIGS. 10(a)–10(d) are graphs showing examples of functions employed as an input/output function of the unit.
Figure 10B:
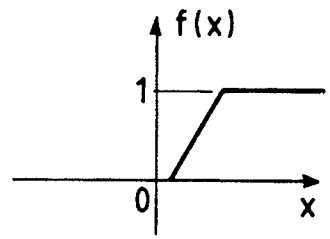
Figure 10C:
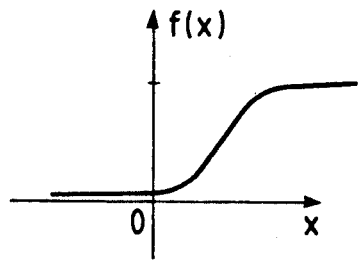
Figure 10D:
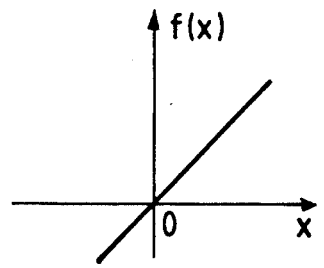

First, assume a neuron model of FIG. 9 in a neural network. In the figure, reference symbol $x_k$ denotes an input to a unit i; $w_{ki}$, strength (weight) of combination from a unit k to the unit i; $y_i$, an output from the unit i; $\theta_i$, a threshold; and $u_i$, a state of the unit i. These parameters are correlated as:

$$u_i=\Sigma w_{ki}x_k-\theta_i$$

$$y_i=f(u_i).$$

Figure 11:
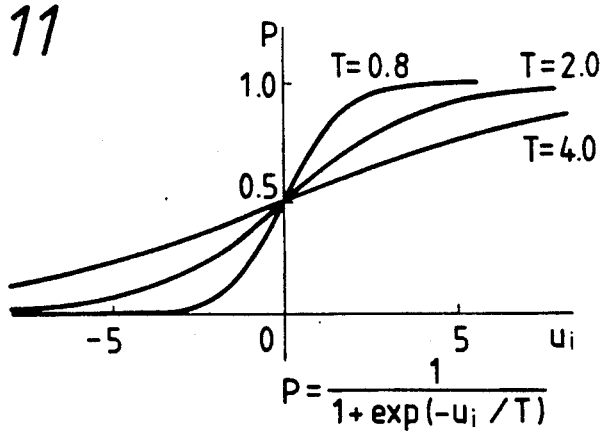
FIG. 11 is a graph showing a sigmoid function employed as an input/output function of the unit.

FIGS. 10(a)-10(d) show a threshold function, partially linear function, logistic function and identity function, respectively, which are employed as an input/output function for a unit. For example, it is known that the mechanism of a unit can be made a probability process (e.g., a Boltzmann machine) by changing the slope of a logistic function shown in FIG. 10(c). A Boltzmann machine, which is constructed by rendering the mechanism of a Hopfield model a probability process, operates according to a probability function as shown in FIG. 11. That is, the input/output function (i.e., the relationship between $u_i$ and P) is a probability function with a parameter T, which is called "temperature". The slope of the function becomes gentler as T becomes larger. On the contrary, the function assumes the form of a threshold function as T reaches 0.

In the Hopfield model algorism, in which initial values of a system influence its settlement conditions, the initial values are, in some cases, not specified by making the initial operation undeterministic (i.e., making T large) and producing a random variation. Further, a system may start operating in a random manner and gradually transfer to a deterministic operation (i.e., T is gradually made small) so that a system is not trapped into a minimal state.

The settlement time of a network can be reduced by changing, until the network settles, the slope of the input/output function of the units (spatial light modulation device) as shown in FIG. 11 to set an appropriate input/output function.

Figure 12:
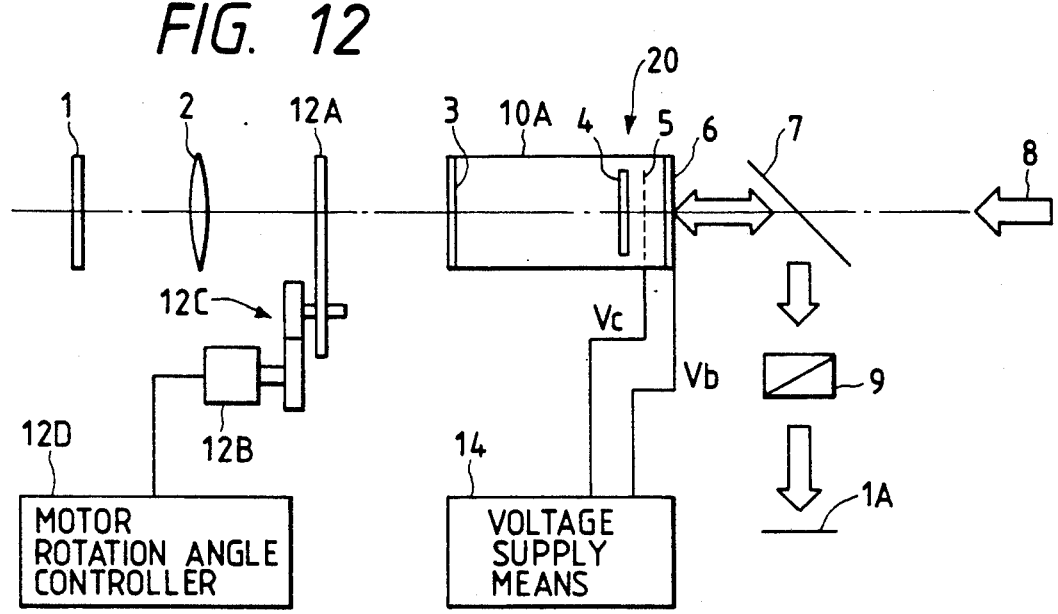
FIG. 12 is a schematic sectional view showing a spatial light modulation device according to a first embodiment of the invention.

The input/output function as shown in FIG. 11 may be realized by a spatial light modulation device 20 shown in FIG. 12, which is a first embodiment of the invention, using its variable-$\gamma$ mode as described above.

In this device, the voltage $V_c$ is shifted to change the temperature T, so that the desired input/output probability operation of units and the input/output function can be realized in a two-dimensional manner in an optical model.

In the embodiment of FIG. 12, a variable ND filter 12 is placed between the lens 2 and the photocathode 3 of the spatial light modulation device 10 of FIG. 1, and the voltage supply means 14 controls the voltages $V_c$ and $V_b$ in the manner as already described above in conjunction with the device of FIG. 1. That is, in the hard clip mode, the voltage supply means 14 decreases the voltage $V_b$ like a ramp function, changes the voltage $V_c$ of the mesh electrode 5, and shifts the variation range of the back surface voltage $V_b$ of the electro-optic crystal plate 6 in accordance with the voltage $V_c$.

The variable ND filter 12 consists of a ND filter 12A, a motor 12B for drive the filter 12A through a gear 12C, and a motor rotation angle controller 12D for adjusting the rotation angle of the motor 12B. The variable ND filter 12 shifts each of the input/output characteristic curves (see FIG. 5) by reducing the input light intensity in accordance with $V_c$ to obtain the characteristics as shown in FIG. 13, in which the curves cross each other at the central point.

In the device 20 of FIG. 12, the voltage applied to the microchannel plate 4 may be changed in accordance with the $\gamma$ value. The input light intensity may be controlled by employing a camera lens, etc. as the lens 2 and adjusting the diaphragm thereof. Further, the decreasing rate of the voltage $V_b$ may be reduced (i.e., made slower) to obtain the effects equivalent to increasing the sensitivity.

Figure 13:
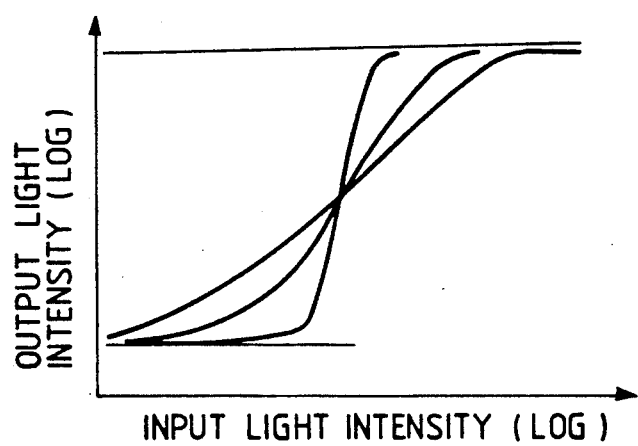
FIG. 13 is a graph showing an input/output characteristic of the device of FIG. 12.

It is noted that the characteristic curves of FIGS. 5 and 13 and the spatial light modulation device 20 are based on the constant decreasing rate of the back surface voltage $V_b$, and the shift of the voltage $V_c$ of the mesh electrode 5 and the ramped variation range of the voltage $V_b$. ($V_c$ must be reduced to realize the thresholding operation.) However, there arises in this case a problem that the reduced $V_c$ impair the sensitivity of the spatial light modulator 20 and may incur an unstable operation.

Figure 14:
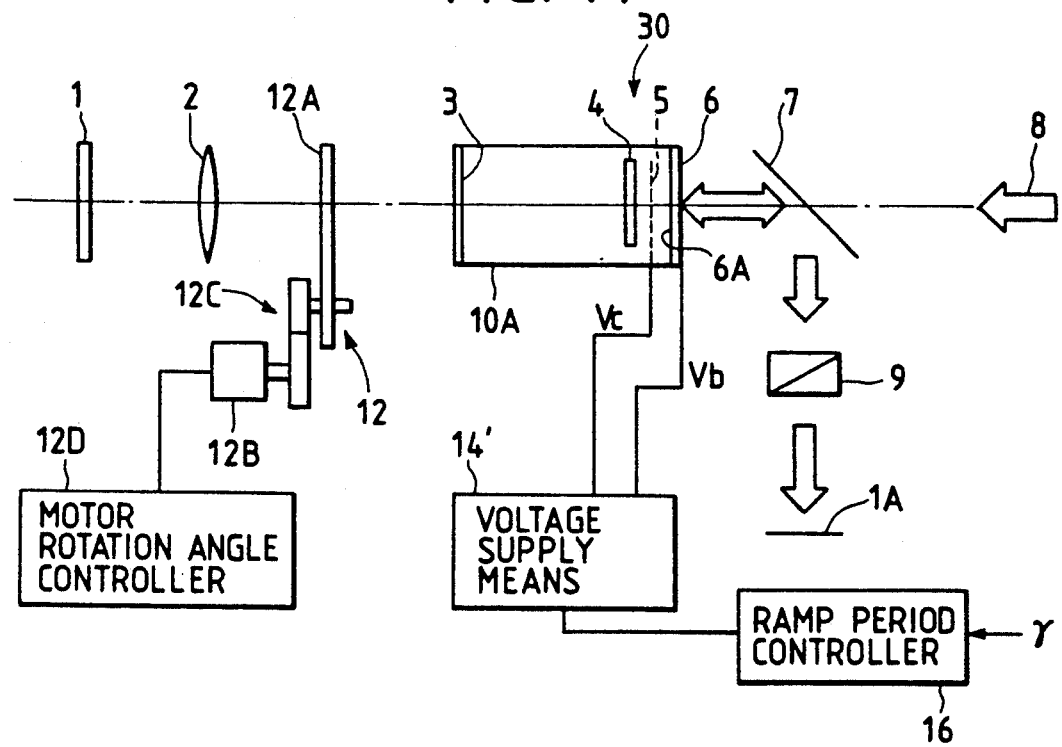
FIG. 14 is a schematic sectional view showing a spatial light modulation device according to a second embodiment of the invention.

FIG. 14 is a spatial light modulation device 30 according to a second embodiment of the invention to solve this problem. The spatial light modulation device 30 is different from the device 20 of FIG. 12 in that the voltage supply means 14' changes the ramp period (i.e., the voltage decreasing rate) instead of changing the voltage $V_c$, and that a ramp period controller 16 is added to control the voltage supply means 14' in accordance with a desired $\gamma$ value input to the controller 16.

Figure 15:
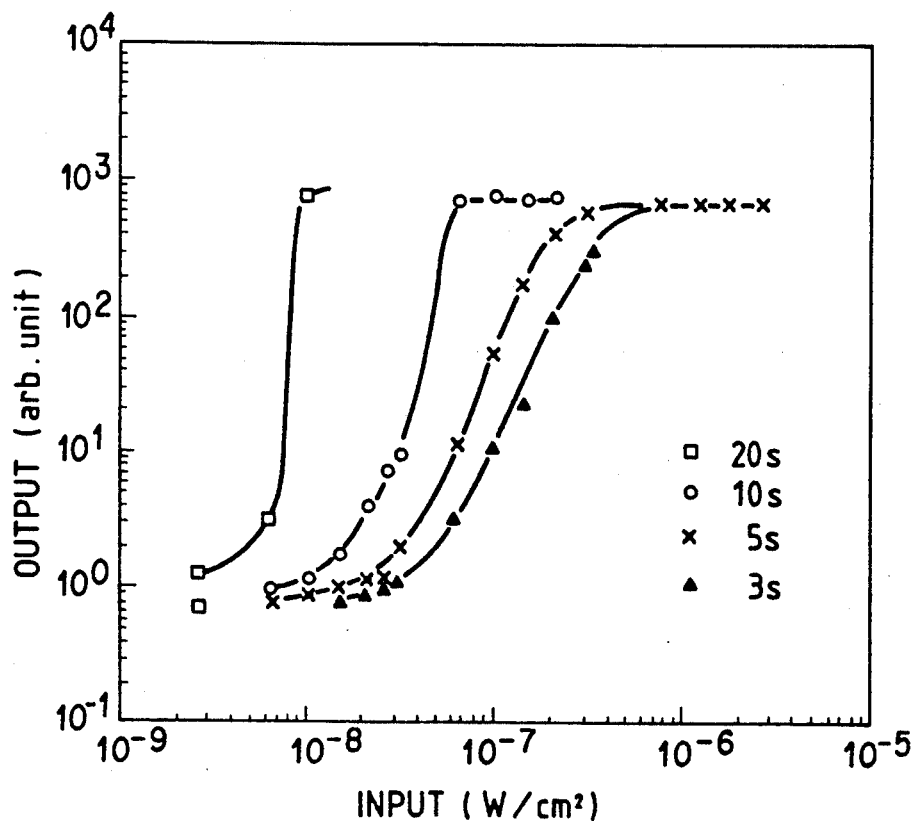
FIG. 15 is a graph showing an input/output characteristic of the device of FIG. 14 in a write-period control mode operation.

As shown in FIG. 15, for example under the condition of $V_c = 1.0$ kV, $V_b = 0.9$-$2.9$ kV and $T_w$ (ramp write period) = 3 sec, an input/output characteristic has a $\gamma$ value close to 2 of the normal mode. As the ramp write period $T_w$ becomes long, the input/output characteristic becomes steep, providing the thresholding operation. The data of FIG. 15 were obtained while keeping the voltages $V_c$ and $V_b$ constant.

As can be seen from FIG. 15, the input/output characteristic curve shifts to the left, i.e., to the weaker input light intensity side, as the operation reaches the thresholding. In order to realize the input/output characteristics as shown in FIG. 13, the intensity of the input light to the spatial light modulator 10A is adjusted by the variable ND filter 12. Alternatively, the voltage applied to the microchannel plate 4 may be adjusted.

The ramp period $T_w$ of the voltage $V_b$ is changed by means of the ramp period controller 16 in accordance with the $\gamma$ value input thereto.

It is understood from the above description that the input/output characteristics of the spatial light modulation device 30 can be changed arbitrarily in the hard clip mode without reducing (shifting) the voltages $V_c$ and $V_b$, i.e., without incurring an unstable operation. Stated in more detailed manner, unlike the case of FIG. 12 (variable-$\gamma$ operation in the "$V_c$ control mode"), the increase of the ramp write period $T_w$, which is accompanied by the shift of the characteristic curve from $\gamma = 2$ to the thresholding, is equivalent to the sensitivity enhancement of the spatial light modulator 10A. Therefore, the intensity of the read light may be lower than the $V_c$ control mode, providing a stable operation of the device.

It is further pointed out here that the spatial light modulation device of FIG. 12, in which the variable-$\gamma$ mode is realized by shifting the voltage $V_c$ and the variation range of $V_b$, has another problem. The relationship between $V_c$ and $|V_{be} - V_{bw}|$ depends on the thickness of the electro-optic crystal plate 6, since it depends on the birefringence which originates from the thickness of the crystal plate 6. On the other hand, it is very difficult to equalize the thicknesses of the electro-optic crystal plates 6 in the order of the wavelength of the read laser light 8. Therefore, it is likely to occur that the setting of the voltages $V_c$ and $V_b$ should be changed from one device to another.

For example, assume a spatial light modulator which operates in the normal mode with the setting of $V_c = 1.9$ kV and $V_b = 0.4$-$2.2$ kV. The voltage $V_c$ can be reduced only down to a limit voltage which is associated with the lower one of $V_{be}$ and $V_{bw}$ ($V_{bw}$ in the case of the positive charge writing) being set at 0 kV. Therefore, in this example, the possible minimum $V_c$ is 1.5 kV, which is associated with $V_b = 0$-$1.8$ kV. Under these conditions, $\gamma$ can only take values close to 2.

Figure 16:
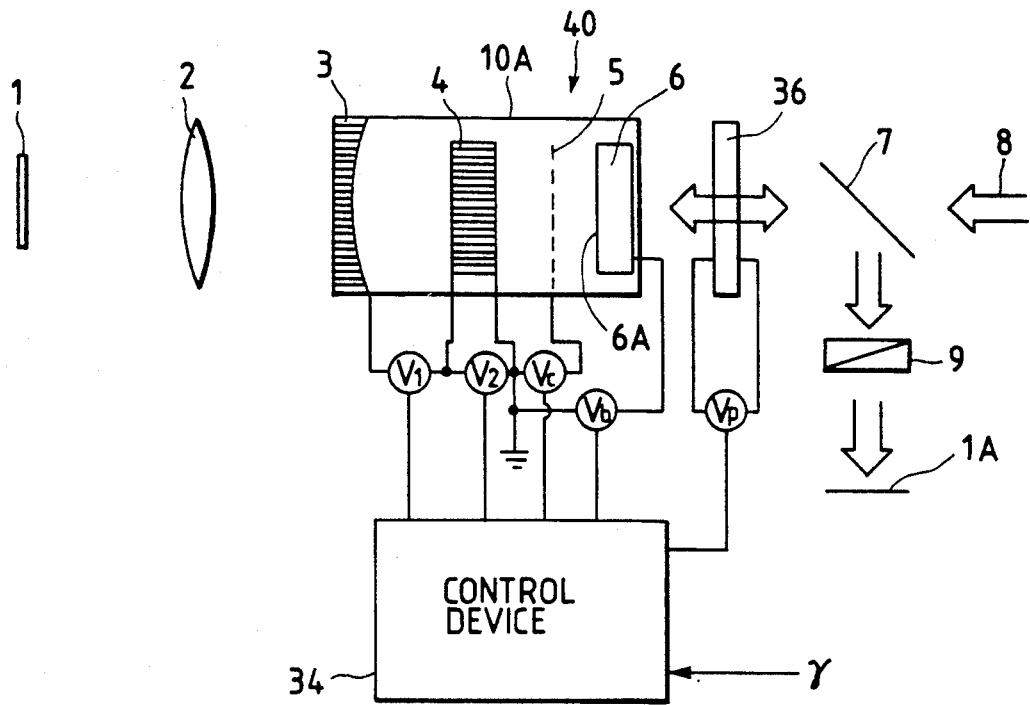
FIG. 16 is a schematic sectional view showing a spatial light modulation device according to a third embodiment of the invention.

FIG. 16 shows a spatial light modulation device 40 according to a third embodiment of the invention to solve this problem. The device 40 of FIG. 16 is different from the device of FIG. 1 in that a birefringent crystal plate 36, e.g., a parallel plane plate made of LiNbO$_3$, is placed between the spatial light modulator 10A and the half mirror 7, and that a control device 34 supplies a voltage to the birefringent crystal plate 36 in addition to the other elements.

In the embodiment of FIG. 16, the birefringence of the electro-optic crystal plate 6 is compensated by providing an appropriate voltage across the birefringent crystal plate 36 from the control device 34, and changing its refractive index $\Delta n$. As a result, a setting such as $V_c = 1.1$ kV and $V = 1.0$-$2.8$ kV becomes possible. That is, the relationship between $V_c$ and $|V_{be} - V_{bw}|$, which is mainly determined by the birefringence of the electro-optic crystal plate 6 in the first embodiment, can be changed by controlling the voltage applied across the birefringent crystal plate 36. With this new setting, the voltage $V_c$ can be reduced down to 0.1 kV, which is associated with $V_b = 0$-$1.8$ kV.

Figure 17:
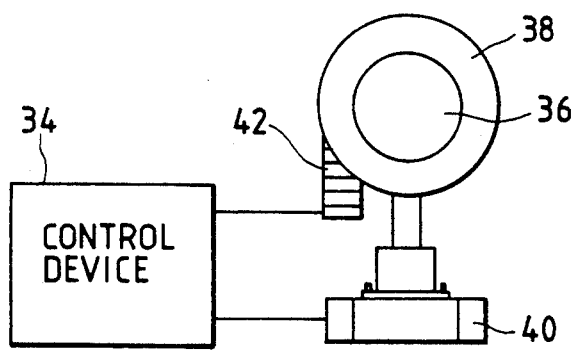
FIG. 17 is a schematic view showing an essential part of a modification of the device of FIG. 16.

FIG. 17 shows a modification of the embodiment of FIG. 16. In this modification, instead of applying a voltage to the plate 36, the plate 36 is rotated by an appropriate amount to change its effective thickness d for the read light, to provide a phase difference corresponding to $d\Delta n$. In FIG. 17, reference numeral 38 denotes a holder for the birefringent crystal plate 36; 40, a stepping motor for rotating the holder 38 about an axis parallel to the surface of the plate 36; and 42, a stepping motor for rotating the plate 36 about its central axis with respect to the holder 38.

According to the third embodiment, not only laser light but also incoherent light can be used as the read light 8. The input/output characteristic can be changed as desired with the use of the incoherent read light.

Figure 18:
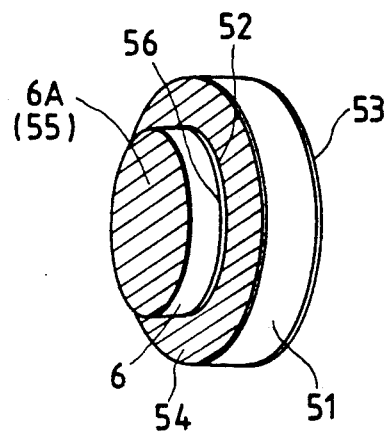
FIG. 18 is a perspective view showing a detailed structure of an electro-optic crystal plate and an output glass window.

FIG. 18 shows an example of a structure including an output glass window 51 and the electro-optic crystal plate 6 which is stuck on the glass window 51 with a transparent adhesive 52. The back surface, i.e., output-side surface, of the glass window 51 is coated with a dielectric material 53 acting as an anti-reflection coating. The front surface of the glass window 51 is coated with a transparent conductive film 54 made of, e.g., ITO and acting both as an anti-reflection film and an electrode for applying a voltage to the crystal plate 6. The charge-storing front surface 6A of the crystal plate 6 is provided with a dielectric mirror, and its back surface 55 an anti-reflection coating 56. The electro-optic crystal plate 6 may be made of a solid crystal such as LiNbO$_3$, KDP and LiTaO$_3$. Alternatively, it may be an organic material such as MNA, or a liquid crystal such as TNLC and FLC. The refractive index of each of these materials can be changed by an applied electric field. The dielectric mirror 35 should have functions of the charge storage and the secondary electron emission, and may be made of a material such as SiO$_2$, ZrO$_2$, CaF$_2$ and glass.

What is claimed is:

1. A spatial light modulation device comprising:
an electro-optic plate having a front surface and a back surface;
means for producing an electron image and for projecting the electron image into the front surface of the electro-optic plate to form a charge pattern on the front surface of the electro-optic plate;
an electrode, disposed in front of the front surface of the electro-optic plate, for capturing secondary electrons emitted from the front surface of the electro-optic plate; and
voltage supply means for supplying a first voltage to the electrode and a second voltage to the back surface of the electro-optic plate, the first voltage being a dc voltage, the second voltage being decreased, in a writing operation of the device, in a ramped variation range, the first and second voltages being set so as to provide a lock-out state, and the first voltage and the ramped variation range of the second voltage being shifted to obtain a desired input/output characteristic of the device.

2. A spatial light modulation device comprising:
an electro-optic plate having a front surface and a back surface;
means for producing an electron image and for projecting the electron image onto the front surface of the electro-optic plate to form a charge pattern on the front surface of the electro-optic plate;
an electrode, disposed in front of the front surface of the electro-optic plate, for capturing secondary electrons emitted from the front surface of the electro-optic plate; and
voltage supply means for supplying a first voltage to the electrode and a second voltage to the back surface of the electro-optic plate, the first voltage being a dc voltage, the second voltage being decreased, in a writing operation of the device, with a ramped decreasing rate, the first and second voltage being set so as to provide a lock-out state, and the ramped decreasing rate of the second voltage being changed to obtain a desired input/output characteristic of the device.

3. A spatial light modulation device comprising:
an electro-optic plate having a front surface and a back surface;
means for producing an electron image and for projecting the electron image onto the front surface of the electro-optic plate to form a charge pattern on the front surface of the electro-optic plate;
an electrode, disposed in front of the front surface of the electro-optic plate, for capturing secondary electrons emitted from the front surface of the electro-optic plate; and
voltage supply means for supplying a first voltage to the electrode and a second voltage to the back surface of the electro-optic plate, the first voltage being a dc voltage and the second voltage being generally decreased.

4. The device according to claims 1, 2 or 3, wherein the electron image producing means includes a photocathode for converting an input optical image into the electron image.

5. The device according to claim 4, further comprising means for reducing intensity of the input optical image so that input/output characteristic curves of the device intersect each other approximately at the center of the curves.

6. The device according to claims 1, 2 or 3, further comprising means for reading out the charge pattern by inputting coherent light to the electro-optic plate.

7. The device according to claims 1 or 2, further comprising a microchannel plate for multiplying electrons which carry the electron image, wherein the voltage supply means supplies a third voltage to the microchannel plate so that input/output characteristic curves of the device intersect each other approximately at the center of the curves.

8. The device according to claims 1 or 2, further comprising a birefringent plate disposed behind the back surface of the electro-optic plate, effective birefringence of the birefringent plate being changed in accordance with the desired input/output characteristic of the device.

9. The device according to claim 8, wherein the effective birefringence is changed by a fourth voltage applied across the birefringent plate from the voltage supply means.

10. The device according to claim 8, further comprising means for rotating the birefringent plate about its central axis to change the effective birefringence.

11. The device according to claim 8, further comprising means for rotating the birefringent plate about an axis parallel to a surface of the birefringent plate to change the effective birefringence.

* * * * *

UNITED STATES PATENT AND TRADEMARK OFFICE
CERTIFICATE OF CORRECTION

PATENT NO. : 5,170,281
DATED : December 8, 1992
INVENTOR(S) : Yuji Kobayashi et al.

It is certified that error appears in the above-identified patent and that said Letters Patent is hereby corrected as shown below:

Claim 2, column 10, line 6-7, change "voltage" to --voltages--.

Claim 7, column 10, line 39, change "claims 1 or 2" to --claim 1,2, or 3--.

Signed and Sealed this

Eleventh Day of January, 1994

Attest:

BRUCE LEHMAN

Attesting Officer    Commissioner of Patents and Trademarks